United States Patent
Park et al.

(10) Patent No.: US 12,172,150 B2
(45) Date of Patent: Dec. 24, 2024

(54) CATALYST FOR HYDROGENATION REACTION AND PREPARATION METHOD FOR SAME

(71) Applicant: HANWHA SOLUTIONS CORPORATION, Seoul (KR)

(72) Inventors: Woo Jin Park, Daejeon (KR); Bong Sik Jeon, Daejeon (KR); Yong Hee Lee, Daejeon (KR); Eui Geun Jung, Daejeon (KR)

(73) Assignee: HANWHA SOLUTIONS CORPORATION, Seoul (KR)

( * ) Notice: Subject to any disclaimer, the term of this patent is extended or adjusted under 35 U.S.C. 154(b) by 478 days.

(21) Appl. No.: 17/623,318

(22) PCT Filed: Jun. 25, 2020

(86) PCT No.: PCT/KR2020/008288
§ 371 (c)(1),
(2) Date: Dec. 28, 2021

(87) PCT Pub. No.: WO2020/262986
PCT Pub. Date: Dec. 30, 2020

(65) Prior Publication Data
US 2022/0362750 A1  Nov. 17, 2022

(30) Foreign Application Priority Data
Jun. 28, 2019 (KR) .................. 10-2019-0078366

(51) Int. Cl.
*B01J 23/755* (2006.01)
*B01J 21/08* (2006.01)
(Continued)

(52) U.S. Cl.
CPC ............ *B01J 23/755* (2013.01); *B01J 21/08* (2013.01); *B01J 35/393* (2024.01); *B01J 35/394* (2024.01);
(Continued)

(58) Field of Classification Search
CPC ........ B01J 23/72; B01J 23/755; B01J 27/043; B01J 35/394; B01J 35/647; B01J 35/393;
(Continued)

(56) References Cited

U.S. PATENT DOCUMENTS

| | | | | |
|---|---|---|---|---|
| 2,513,529 | A * | 7/1950 | Stejskal | B01J 23/755 502/222 |
| 6,281,163 | B1 | 8/2001 | Van Dijk | |
| 11,878,286 | B2 * | 1/2024 | Park | B01J 37/035 |
| 11,987,659 | B2 * | 5/2024 | Jeon | B01J 35/615 |

(Continued)

FOREIGN PATENT DOCUMENTS

| | | |
|---|---|---|
| CN | 1816392 A | 8/2006 |
| CN | 101172237 A | 5/2008 |

(Continued)

OTHER PUBLICATIONS

An Office Action issued on Aug. 1, 2023 in the corresponding Chinese Patent Application.

(Continued)

*Primary Examiner* — Patricia L. Hailey
(74) *Attorney, Agent, or Firm* — Harvest IP Law, LLP

(57) ABSTRACT

According to the present invention, when preparing a hydrogenation catalyst including nickel as an active ingredient, the reduction of nickel can be facilitated by using copper and sulfur as a promoter. In particular, the present invention can provide a catalyst which, while having a high nickel content, includes sulfur oxide and nickel oxide in a particular range, and thus exhibits even higher selective reduction degree for olefins while having high activity of the catalyst.

19 Claims, 1 Drawing Sheet

(51) Int. Cl.
  *B01J 35/30* (2024.01)
  *B01J 35/40* (2024.01)
  *B01J 35/61* (2024.01)
  *B01J 35/63* (2024.01)
  *B01J 35/64* (2024.01)
  *B01J 37/03* (2006.01)
  *B01J 37/18* (2006.01)
  *C08F 8/04* (2006.01)

(52) U.S. Cl.
  CPC .............. *B01J 35/40* (2024.01); *B01J 35/615* (2024.01); *B01J 35/633* (2024.01); *B01J 35/647* (2024.01); *B01J 37/035* (2013.01); *B01J 37/18* (2013.01); *C08F 8/04* (2013.01)

(58) Field of Classification Search
  CPC ........ B01J 35/615; B01J 35/633; B01J 35/40; B01J 21/08; B01J 37/035; B01J 37/18; C08F 8/04
  USPC ....... 502/337, 331, 345, 216, 218, 222, 244, 502/259; 525/338; 208/143, 144
  See application file for complete search history.

(56) References Cited

U.S. PATENT DOCUMENTS

| | | | |
|---|---|---|---|
| 11,999,911 B2 * | 6/2024 | Park | B01J 33/00 |
| 2009/0318738 A1 * | 12/2009 | Fecant | B01J 23/44 |
| | | | 585/269 |
| 2020/0369794 A1 * | 11/2020 | Seo | B01J 21/08 |
| 2022/0362749 A1 * | 11/2022 | Park | B01J 37/088 |

FOREIGN PATENT DOCUMENTS

| | | | | |
|---|---|---|---|---|
| CN | 102407118 A | 4/2012 | | |
| CN | 102451689 A | 5/2012 | | |
| CN | 102451691 A | 5/2012 | | |
| CN | 104588024 A | 5/2015 | | |
| EP | 3907001 A1 | 11/2021 | | |
| JP | 2002275212 A | 9/2002 | | |
| KR | 1020020024713 A | 4/2002 | | |
| KR | 1020090064455 A | 6/2009 | | |
| KR | 1020130051937 A | 5/2013 | | |
| KR | 1020150053772 A | 5/2015 | | |
| KR | 1020160040177 A | 4/2016 | | |
| KR | 101122209 B1 | 3/2021 | | |
| WO | 9601691 A1 | 1/1996 | | |
| WO | WO-2009134843 A1 * | 11/2009 | ............. | B01J 21/04 |
| WO | 2019201618 A1 | 10/2019 | | |
| WO | 2020141705 A1 | 7/2020 | | |

OTHER PUBLICATIONS

Hydrogenation of Dicyclopentadiene Resin and Its Monomer over High Efficient CuNi Alloy Catalysts, Zongxuan Bai et al., 2019 Wiley-VCH Verlag Gmbh & Co. KGaA, Weinheim, ChemistrySelect 2019, 4, pp. 6035-6042 DOI: 10.1002/slct.201900476.

Selective hydrogenation of 1,3_pentadiene over mono_ and bimetallic sulfidized Ni(Cu)—S/SiO2 catalysts, Russian Chemical Bulletin, International Edition, vol. 65, No. 12, pp. 2841-2844, Dec. 2016, pp. 2841-2844.

An Extended European Search Report issued on Sep. 22, 2023.

* cited by examiner

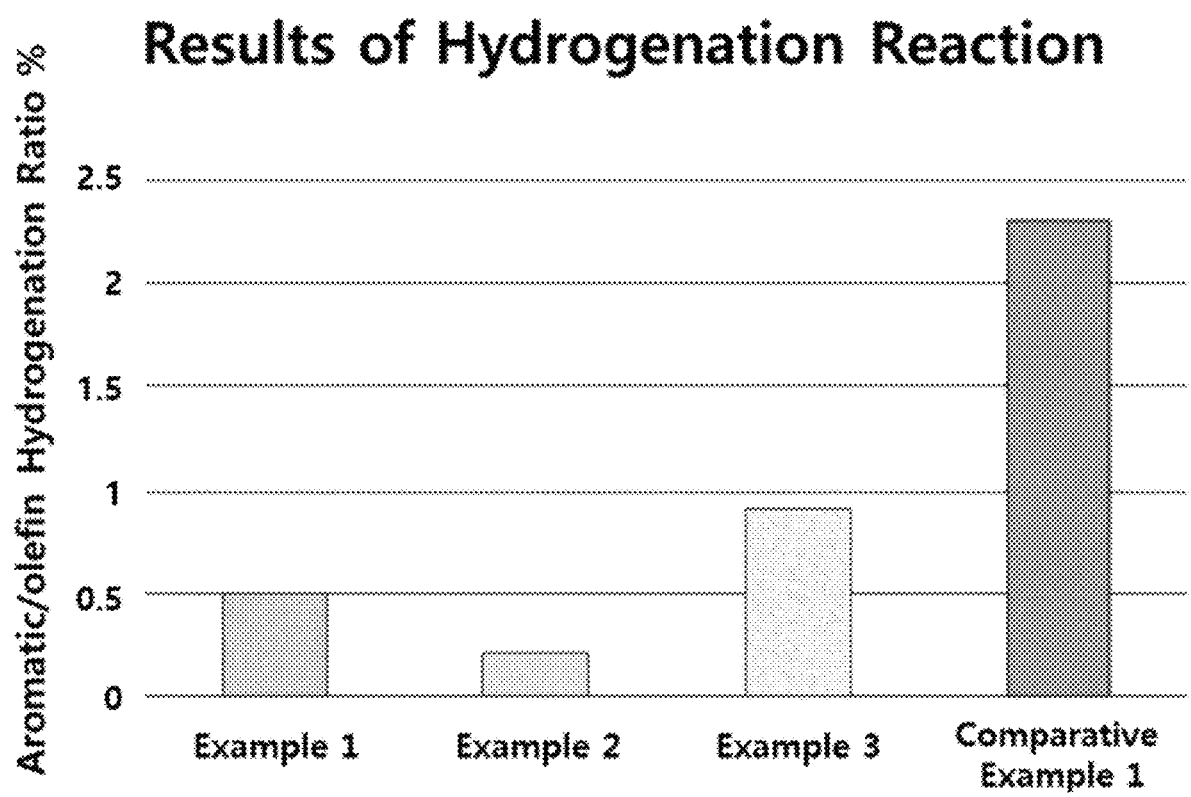

CATALYST FOR HYDROGENATION REACTION AND PREPARATION METHOD FOR SAME

CROSS-REFERENCE TO RELATED APPLICATIONS

This application is a National Stage of International Application No. PCT/KR2020/008288 filed Jun. 25, 2020, claiming priority based on Korean Patent Application No. 10-2019-0078366 filed Jun. 28, 2019.

TECHNICAL FIELD

The present invention relates to a catalyst for a hydrogenation reaction and a preparation method for the same. More specifically, the present invention relates to a nickel-based catalyst that includes nickel or nickel oxide as an active ingredient and copper and sulfur as a promoter (accelerator) and is provided for a hydrogenation reaction of a hydrocarbon resin.

BACKGROUND ART

Lower olefins (e.g., ethylene, propylene, butylene, butadiene, etc.) and aromatic compounds are basic intermediates that are widely used in the petrochemical and chemical industries. Thermal cracking or steam pyrolysis is the main type of process that is typically performed for forming these materials in the presence of steam and in the absence of oxygen. A feedstock may include naphtha, petroleum gases and distillates such as kerosene and gas oil. In this case, naphtha or the like may be pyrolyzed to produce materials such as C4 fraction including ethylene, propylene, butane, and butadiene, cracked gasoline (including benzene, toluene, and xylene), cracked kerosene (C9 or more fractions), cracked heavy oil (ethylene bottom oil), and hydrogen gas. Hydrocarbon resins may be prepared by polymerizing fractions and the like.

However, since hydrocarbon resins include unsaturated bonds in part, the quality thereof may deteriorate. At this time, if a hydrogenation process of adding hydrogen is performed, unsaturated bonds are removed so that the color becomes brighter and the odor peculiar to hydrocarbon resins decreases, resulting in an improvement in quality. In addition, hydrocarbon resins, from which unsaturated bonds are removed, are called water-white resins because they are colorless and transparent, and are distributed as high-quality resins with excellent heat and ultraviolet stability.

For the hydrocarbon resins in which C5 fractions, C9 fractions, dicyclopentadiene (DCPD) are copolymerized, the compatibility with styrene-based polymers such as styrene-isoprene-styrene (SIS) or styrene-butadiene-styrene (SBS) is adjusted according to an aromatic content. Therefore, in order to prepare water-white resins while controlling the aromatic content in the hydrocarbon resin hydrogenation reaction, it is necessary to selectively hydrogenate the olefin part of the resin.

Therefore, various catalysts have been studied to hydrogenate the unsaturated hydrocarbon resin feedstock. In particular, it is known that a noble metal catalyst such as palladium (Pd) or platinum (Pt) is used in order to selectively hydrogenate olefin in aromatic unsaturated hydrocarbons. The palladium catalyst is mainly used as a selective hydrogenation catalyst due to its excellent activity and selectivity compared to other metal catalysts. However, the palladium catalyst has a problem that, when hydrogenation is performed in a liquid phase, palladium is lost and Pd complex compounds are formed.

In addition, a nickel (Ni)-based catalyst has an advantage of high activity in a hydrogenation reaction, compared with catalysts including other transition metals. In order to secure the activity of the catalyst in the hydrocarbon resin hydrogenation reaction, nickel is preferably included in an amount of at least 40 wt %. In a case in which nickel is supported on a carrier, as the nickel content increases, dispersibility decreases, resulting in an increase in the size of nickel crystals and reducing the activity of the catalyst accordingly. If the nickel content is lowered so as to prevent the above problem, dispersibility is relatively improved, but activity is reduced. Therefore, it is necessary to support a high content of nickel and also maintain a crystal size of nickel at an appropriate level. In addition, it is difficult to use for the selective hydrogenation of unsaturated hydrocarbons including aromatic groups because olefins and aromatics are hydrogenated together.

Therefore, in order to solve this problem, the development of catalysts for a hydrogenation reaction are actively in progress.

Korean Patent Publication No. 10-2015-0053772 discloses a self-supported mixed metal sulfide (MMS) catalyst for hydrogenating a hydrocarbon feedstock and a method for preparing the catalyst.

Korean Patent Registration No. 10-1122209 discloses an alumina carrier and a cobalt or nickel metal catalyst supported thereon.

However, the above patents have some limitations that do not provide a fundamental solution to the problem of selective hydrogenation of aromatics/olefins and the improvement in dispersibility for a high content of nickel catalyst.

Therefore, the present inventors developed a nickel-based catalyst including copper and sulfur as a promoter through research, and established a method for improving dispersibility for a high content of nickel catalyst as well as the problem of selective hydrogenation of aromatics/olefins.

In addition, the present invention was completed in order to easily secure a water-white resin by using the catalyst developed as described above.

(Patent Literature 1) Korean Patent Publication No. 10-2015-0053772 (2015 May 18)

(Patent Literature 2) Korean Patent Publication No. 10-1122209 (2012 Feb. 23)

DESCRIPTION OF EMBODIMENTS

Technical Problem

The present invention aims to solve the above-described problems.

Another object of the present invention is to provide a catalyst for a hydrogenation reaction, which has a high content of nickel and a small crystallite size of nickel while improving dispersibility and activity.

Another object of the present invention is to include sulfur as a promoter, so that olefins are selectively reacted by significantly reducing a rate of aromatic hydrogenation relative to olefins in a hydrogenation reaction of an unsaturated hydrocarbon compound including an aromatic group.

In addition, the present invention aims to easily produce a water-white resin by controlling an aromatic content in a hydrogenation reaction of a hydrocarbon resin.

Solution to Problem

In order to achieve the above-described objects of the present invention and achieve the characteristic effects of the present invention described below, the characteristic construction of the present invention is as follows.

According to the present invention, there is provided a catalyst for a hydrogenation reaction, including an active ingredient, a promoter, and a silica carrier.

According to the present invention, there is provided a catalyst for a hydrogenation reaction, including 0.5-3 parts by weight of at least one first promoter selected from copper and copper oxide, 3-15 parts by weight of at least one second promoter selected from sulfur and sulfur oxide, and 10-40 parts by weight of a silica carrier, based on 40-90 parts by weight of at least one active ingredient selected from nickel and nickel oxide.

According to the present invention, the catalyst is a hydrogenation catalyst in which a precursor forms a precipitate and is supported on a carrier. Preferably, the hydrogenation catalyst is prepared by a deposition-precipitation (DP) method. The prepared catalyst may be provided as a catalyst for hydrogenating a hydrocarbon resin through a hydrogenation reaction.

According to another embodiment of the present invention, there is provided a method for preparing a catalyst for a hydrogenation reaction, the method including the steps of: (a) preparing a first solution by dissolving 0.01-5 parts by weight of at least one promoter selected from copper and copper oxide and 10-40 parts by weight of a silica carrier in a solvent, based on 40-90 parts by weight of at least one active ingredient selected from nickel and nickel oxide; (b) adding the first solution to a precipitation container and heating the first solution to a temperature of 60-100° C. while stirring; (c) preparing a second solution by adding a pH control agent and 3-15 parts by weight of at least one promoter selected from sulfur and sulfur oxide to a precipitation container, and adding the second solution dropwise to the first solution to prepare a precipitate; (d) washing and filtering the precipitate and drying the precipitate to prepare a dried product; and (e) reducing the dried product in a hydrogen atmosphere at a temperature of 200-500° C. to prepare a reduced product.

In addition, in some cases, the method may further include, after the step (d), calcining the prepared dried product in an air atmosphere, and may further include, after the step (e), passivating the catalyst.

According to the present invention, there is provided a hydrogenation method for hydrogenating a hydrocarbon resin, which contacts a hydrocarbon resin with hydrogen in the presence of the catalyst prepared by the method described above.

Advantageous Effects of Disclosure

The present invention has an effect of providing a catalyst for a hydrogenation reaction, which has a small crystallite size of nickel and improved dispersibility while including a high content of nickel, thereby improving activity.

According to the present invention, since sulfur is included as a promoter, olefins are selectively hydrogenated by significantly reducing a rate of aromatic hydrogenation relative to olefins in a hydrogenation reaction of an unsaturated hydrocarbon compound including an aromatic group.

Therefore, it is possible to control the aromatic content of the unsaturated hydrocarbon compound including the aromatic group.

In addition, the present invention has an effect of easily producing a water-white resin by controlling an aromatic content in a hydrogenation reaction of a hydrocarbon resin.

BRIEF DESCRIPTION OF DRAWING

FIG. 1 is a graph showing the results of hydrogenation reactions according to Examples and Comparative Example.

BEST MODE

In the following detailed description of the present invention, reference is made by way of illustration to specific embodiments in which the present invention can be carried out. The embodiments will be described in detail in such a manner that the present invention can be carried out by those of ordinary skill in the art. It should be understood that various embodiments of the present invention are different from each other, but need not be mutually exclusive. For example, certain shapes, structures, and features described herein may be implemented in other embodiments without departing from the spirit and scope of the present invention in connection with one embodiment. In addition, it should be understood that the locations or arrangement of individual components in the embodiments can be changed without departing from the spirit and scope of the present invention. Therefore, the following detailed description is not to be taken in a limiting sense, and the scope of the present invention is to be limited only by the appended claims and the entire scope of equivalents thereof, if properly explained.

Hereinafter, the present invention will be described with reference to preferred embodiments of the present invention, so that those of ordinary skill in the art can easily carry out the present invention.

In general, since both olefins and aromatics included in an unsaturated hydrocarbon compound including an aromatic group during a hydrogenation reaction can be hydrogenated through a catalytic reaction, a catalyst capable of selectively hydrogenating olefins is required so as to control the content of aromatics in a hydrocarbon resin. It is known that, in the case of using a nickel-based catalyst, the activity in the hydrogenation reaction is higher than that of other transition metals, but it is difficult to control the aromatic content of the hydrocarbon resin because olefins and aromatics are hydrogenated together.

However, in a selective hydrogenation catalyst according to an embodiment of the present invention, sulfur is supported together with nickel as a promoter. Therefore, it is possible to greatly reduce a rate of aromatic hydrogenation relative to olefins in a hydrogenation reaction of an unsaturated hydrocarbon compound including an aromatic group, thereby selectively hydrogenating olefins.

A catalyst for a hydrogenation reaction according to the present invention includes an active ingredient, a promoter, and a silica carrier, wherein the active ingredient includes at least one selected from nickel and nickel oxide, the promoter includes at least one selected from copper, sulfur, copper oxide, and sulfur oxide, and the silica carrier is provided as a support.

The catalyst for the hydrogenation reaction includes 0.5-3 parts by weight of at least one first promoter selected from copper and copper oxide, 3-15 parts by weight of at least one second promoter selected from sulfur and sulfur oxide, and 10-40 parts by weight of a silica carrier, based on 40-90 parts by weight of at least one active ingredient selected from nickel and nickel oxide.

According to the present invention, a nickel source (precursor) may include nickel and metal salts such as nitrate, acetate, sulfate, chloride, etc., and most preferably a nickel sulfate precursor including sulfate.

In addition, as copper and sulfur sources (precursors), a state of being bonded to metal salts such as nitrate, acetate, sulfate, chloride, or a combination thereof is used. Preferably, sodium sulfide or copper sulfate is provided. Furthermore, a precipitant such as sodium carbonate or sodium hydrogen carbonate may be provided.

In addition, the nickel oxide may be preferably NiO, the copper oxide may be CuO.

In the catalyst for the hydrogenation reaction according to the present invention, the compound such as nickel or nickel oxide as the active ingredient and the promoter such as copper or copper oxide are mixed in a solvent, and then a solid carrier is suspended therein, so that the nickel compound and the promoter form a precipitate. The precipitate may be deposited on the silica carrier.

The nickel forms the precipitate with the promoter such as the copper and the sulfur, is supported on the silica carrier, and is deposited and precipitated.

In a deposition-precipitation (DP) method, a metal precursor salt solution and a pH control agent react in a carrier dispersion to form a precipitate, and this is adsorbed and solidified on the surface of the carrier. It was confirmed that the uniformity of the catalyst was incomparable, compared with metal catalysts produced by an existing coprecipitation method and impregnation method. Therefore, when the catalyst is prepared by the DP method using silica having a uniform particle size distribution as the carrier, it is easy to select and optimize a carrier having a particle size, size distribution, surface area, pore structure, etc. suitable for the reaction.

On the other hand, the nickel catalyst has excellent catalyst activity in the hydrogenation reaction as described above; however, in the DP method that causes the deposition-precipitation in a state of being supported on the silica carrier, when a high content of nickel is supported, the crystallite size of nickel is increased and the dispersibility is deteriorated, thus lowering the activity. In order to prevent this problem, when the content of nickel is reduced, the dispersibility is relatively improved, but the catalyst activity is lowered. Thus, it was difficult to commercialize the nickel catalyst by the DP method. In addition, the existing DP method provides the activation of the catalyst by performing a reduction reaction at a high temperature exceeding 450° C.

According to the present invention, copper is added to nickel as a promoter and a catalyst composition is supported on a carrier by a DP method. Thus, it is possible to obtain a high reduction degree of nickel at a lower temperature than an existing known method. Even when supported by the DP method, the nickel content is high, the crystallite size of nickel is small, and a degree of dispersion after reduction is high. Therefore, it is possible to provide a catalyst having excellent activity in a hydrogenation reaction. That is, it is possible to optimize a process of preparing a catalyst having physical properties such as a particle size, size distribution, specific surface area, and pore structure suitable for the reaction and having a higher reduction degree of nickel (Ni) metal.

According to an embodiment of the present invention, the reduction degree of nickel may be measured by hydrogen-temperature program reduction ($H_2$-TPR). The $H_2$-TPR evaluates the reducing ability of catalyst particles. A reduction degree analysis method is as follows.

[Reduction Degree Analysis Method]

$$\text{Degree of reduction} = \frac{②-①}{②} \times 100$$

① base area of TPR graph after hydrogenation
② base area of TPR graph after calcination
① Analysis Method
1) Amount of Catalyst Used
   0.05 g
2) Catalyst Pretreatment
   He flows and temperature is raised to 300° C.
   $H_2$ flows and temperature is maintained at 300° C. for 45 minutes.
   He flows and cooling analysis is performed at 30° C.
3) $H_2$-TPR Analysis
   Gas to be analyzed: $H_2$/Ar mixed gas
   Temperature: Raising temperature at a rate from 30° C. to 810° C.
② Analysis Method
1) Amount of Catalyst Used
   0.05 g
2) Catalyst Pretreatment
   He flows and temperature is raised to 300° C.
   $H_2$ flows and temperature is maintained at 300° C. for 45 minutes.
   $H_2$ flows and temperature is raised to 400° C.
   $O_2$ flows and temperature is maintained at 400° C. for 2 hours.
   Cooling to 60° C.
3) $H_2$-TPR Analysis
   Gas to be analyzed: $H_2$/Ar mixed gas
   Temperature: Raising temperature at a rate from 60° C. to 810° C.

According to the present invention, the active ingredient, the first promoter, and the second promoter may be included, wherein the second promoter is included in an amount of 3-15 parts by weight based on 100 parts by weight of all of the active ingredient, the first promoter, and the second promoter. That is, a second promoter/(active ingredient+first promoter+second promoter) weight ratio is 3 to 15. Therefore, the promoter does not reduce the reduction degree of nickel that is the active ingredient, may maximize the activity of the catalyst, and may improve selectivity to olefins relative to aromatics.

According to the present invention, the active ingredient may be included in an amount of 50 parts by weight or more, and preferably 50-70 parts by weight, and the second promoter and the active ingredient may be included, wherein the second promoter may be included in an amount of 5-20 parts by weight based on 100 parts by weight of the active ingredient. That is, a second promoter/active ingredient weight ratio is 5 to 20. Therefore, it is possible to increase a degree of dispersibility by sulfur while having a high content of nickel, thereby further improving selectivity to olefins relative to aromatics.

When the content of the active ingredient is less than 50 parts by weight, the catalyst hydrogenation performance per unit mass may be lowered. Therefore, cost loss may be caused because the amount of catalyst used has to be increased so as to achieve productivity.

In addition, when the second promoter/(active ingredient+first promoter+second promoter) weight ratio is less than 3 parts by weight and the second promoter/active ingredient weight ratio is less than 5 parts by weight, the hydrogenation selectivity to olefins relative to aromatics is significantly lowered. Therefore, it may be difficult to constantly control the aromatic content. When the second promoter/(active ingredient+first promoter+second promoter) weight ratio exceeds 15 parts by weight and the second promoter/active ingredient weight ratio exceeds 20 parts by weight, the hydrogenation performance for olefins may be sharply lowered, and thus productivity may be lowered.

According to the present invention, the average crystallite size of the active ingredient is 1-10 nm, and more preferably 3-7 nm. When the average crystallite size of nickel is out of the above range, catalyst activity may be lowered.

According to the present invention, the silica carrier has a specific surface area of 200-400 $m^2/g$ and a pore size of 10-30 nm. Therefore, it is possible to improve activity and catalyst life and it is possible to optimally provide an effect of improving the efficiency of the process of separating the product and the catalyst.

According to the present invention, the silica carrier having a particle size, size distribution, surface area, pore structure, etc. suitable for the reaction and the catalyst in the range of the above-described optimized combination are provided.

According to the present invention, the hydrogenation reaction has higher selectivity to olefins relative to aromatics. After the hydrogenation reaction of olefin-based unsaturated hydrocarbons, the hydrocarbon resins including aromatic moieties have higher compatibility with base polymers such as styrene-isoprene-styrene (SIS) and styrene-butadiene-styrene (SBS), compared with hydrocarbon resins including no aromatic moieties.

According to the present invention, the reactant in the hydrogenation reaction may be a hydrocarbon resin (petroleum resin). In this case, the hydrocarbon resin may include dicyclopentadiene (DCPD).

Furthermore, the reactant in the hydrogenation reaction may be a hydrocarbon resin including $C_5$ fraction or a hydrocarbon resin including $C_9$ fraction. In addition, the reactant in the hydrogenation reaction may be a hydrocarbon resin including DCPD fraction by-products and a combination thereof, and may include cyclic diene and benzene functional groups, but the present invention is not limited thereto.

The DCPD has a yellow color due to unsaturated bonds remaining after polymerization (unsaturated bonds of olefins and aromatics), has a foul odor, and is easily oxidized in air. Therefore, in order to improve the quality of the hydrocarbon resin, when the hydrogenation reaction is performed under high temperature and high pressure conditions by using the nickel-based catalyst according to the present invention, a colorless, odorless, and transparent water-white hydrocarbon resin with improved thermal stability, from which unsaturated bonds are removed, may be provided.

The catalyst according to the present invention may be in the form of powder, particles, or granules. The catalyst according to the present invention is preferably provided in the form of powder.

Furthermore, when the hydrogenation reaction of the hydrocarbon resin is completed, the catalyst for the hydrogenation reaction according to the present invention has an APHA value of 30 or less. APHA color is also referred to as Hazen scale or cobalt (Pt/Co) scale and is a color standard analysis method (ASTM D1209) named for the American Public Health Association. The color of the hydrogenated hydrocarbon resin is analyzed by APHA value. When the color of the hydrocarbon resin is 30 or less, the hydrocarbon resin becomes a water-white resin in which the color and smell of the hydrocarbon resin almost disappear. At this time, the content of the remaining olefin (NMR % area) is less than 0.1%. Therefore, the use of the catalyst for the hydrogenation reaction according to the present invention may help improving the selectivity to olefins relative to aromatics.

On the other hand, according to another embodiment of the present invention, there is provided a method for preparing the catalyst for the hydrogenation reaction.

The method for preparing the catalyst for the hydrogenation reaction according to the present invention includes the steps of: (a) preparing a first solution by dissolving 0.01-5 parts by weight of at least one promoter selected from copper and copper oxide and 10-40 parts by weight of a silica carrier in a solvent, based on 40-90 parts by weight of at least one active ingredient selected from nickel and nickel oxide; (b) adding the first solution to a precipitation container and heating the first solution to a temperature of 60-100° C. while stirring; (c) after the heating, preparing a second solution by adding a pH control agent and 3-15 parts by weight of at least one promoter selected from sulfur and sulfur oxide to a precipitation container, and adding the second solution dropwise to the first solution to prepare a precipitate; (d) washing and filtering the precipitate and drying the precipitate to prepare a dried product; and (e) reducing the dried product in a hydrogen atmosphere at a temperature of 200-500° C. to prepare a reduced product.

Furthermore, the method may further include, after the step (e), passivating the catalyst.

The passivating step may be provided in two methods. First, the passivating step may be performed by passivation with a nitrogen mixed gas including 0.1-20% oxygen, or may be performed by deposition in a solution included in an organic solvent such as a hydrocarbon resin.

In the case of passivation with the gas, % in the 0.1-20% oxygen refers to volume %. For example, D40 Exxsol may be used as the organic solvent. The organic solvent capable of blocking air may be used without limitation.

In addition, according to the present invention, the method may further include, after the step (d), calcining the dried product prepared before the reduction of the step (e) in an air atmosphere. The step of calcining the dried product in the air atmosphere is not necessarily provided, and those of ordinary skill in the art may appropriately select the step according to necessity. In this case, the temperature is 200-500° C.

According to the present invention, the preparing of the precipitate in the step (c) may be performed in an environment of pH 7 or higher, and preferably pH 7-9, by the addition of a base or an electrochemical means. In this case, a basic compound may be added for the addition of the base. The basic compound may include sodium carbonate, sodium hydroxide, sodium hydrogen carbonate, ammonia, or a hydrate thereof, and preferably sodium carbonate or a hydrate thereof, but the present invention is not limited thereto.

Furthermore, the method may further include, after the step (e), passivating the catalyst.

The passivating step may be provided in two methods. First, the passivating step may be performed by passivation with a nitrogen mixed gas including 0.1-20% oxygen, or may be performed by deposition in a solution included in an organic solvent such as a hydrocarbon resin.

In the case of passivating the reduced product with the gas, % in the 0.1-20% oxygen refers to volume %. For example, D40 Exxsol may be used as the organic solvent. The organic solvent capable of blocking air may be used without limitation.

In addition, according to the present invention, the method may further include, after the step (d), calcining the dried product prepared before the reduction of the step (e) in an air atmosphere. The step of calcining the dried product in the air atmosphere is not necessarily provided, and those of ordinary skill in the art may appropriately select the step according to necessity. In this case, the temperature is 200-500° C.

According to the present invention, the preparing of the precipitate in the step (c) may be performed in an environment of pH 7 or higher, and preferably pH 7-9, by the addition of a base or an electrochemical means. In this case, a basic compound may be added for the addition of the base. The basic compound may include sodium carbonate, sodium hydroxide, sodium hydrogen carbonate, ammonia, or a hydrate thereof, and preferably sodium carbonate or a hydrate thereof, but the present invention is not limited thereto.

According to the present invention, there is provided a hydrogenation method for contacting a hydrocarbon resin with hydrogen in the presence of the catalyst for the hydrogenation reaction prepared by the above-described producing method.

The hydrocarbon resin may be hydrogenated at a temperature of 100-400° C., and preferably 200-300° C., and at a pressure of 1-200 bar, and preferably 30-100 bar. A hydrogenation time may depend primarily on the temperature, the amount of catalyst, and the degree of hydrogenation.

A hydrogenation reaction may be carried out in various reactors. Preferably, the hydrogenation reaction may be carried out in a continuous stirred tank reactor (CSTR) or a loop reactor. In addition, the optimal activity may be exhibited when a reduction temperature is 200-500° C., and preferably 350-450° C., as described above.

According to the present invention, the hydrocarbon resin that is the reactant in the hydrogenation reaction may include dicyclopentadiene (DCPD). In addition, a hydrocarbon resin including $C_5$ fraction may be provided, and a hydrocarbon resin including $C_9$ fraction may be provided.

Furthermore, the hydrocarbon resin contacts hydrogen and has an APHA value of 30 or less when the hydrogenation reaction is completed. In addition, in the hydrogenation reaction, the selectivity to olefins relative to aromatics is higher, and the aromatic/olefin hydrogenation ratio is 0.1 to 1.0.

Hereinafter, the structure and operation of the present invention will be described in more detail with reference to preferred examples of the present invention. However, these examples are shown by way of illustration and should not be construed as limiting the present invention in any sense.

Since contents not described herein can be sufficiently technically inferred by those of ordinary skill in the art, descriptions thereof will be omitted.

Example 1

40 g of a porous silica powder having a surface area of 310 $m^2/g$ and a pore size of 30 nm, 491 g of nickel sulfate, 6 g of copper sulfate, and 2,000 mL of distilled water were added to a precipitation container, stirred, and heated to a temperature of 80° C. After the temperature reached 80° C., 1,500 mL of a solution including 262 g of sodium carbonate and 19.1 g of sodium sulfide was all injected within 1 hour by using a syringe pump. After completion of precipitation, a slurry had a pH of 7.6, was washed with about 30 L of distilled water, filtered, and then dried at 100° C. for 12 hours or more by using a drying oven. This was subdivided and calcined at a temperature of 400° C. in an air atmosphere. After this was subdivided again, the reduction was performed at a temperature of 400° C. in a hydrogen atmosphere. After the reduction, the powder was passivated using a nitrogen mixed gas including 1% oxygen to prepare a hydrogenation catalyst.

Based on the weight of the catalyst, an active ingredient content of a passivated catalyst was measured as 74.6 parts by weight, a weight of a second promoter was measured as 6.2 parts by weight, a weight of a first promoter was measured as 0.95 parts by weight, and an average size of nickel crystals was measured as 4.4 nm. A BET specific surface area was 250 $m^2/g$, a total pore volume was 0.32 $m^3/g$, and an average pore size was 5.2 nm. A nickel (Ni) reduction degree analyzed by $H_2$-TPR was 95%.

In the prepared catalyst, a second promoter/(active ingredient+first promoter+second promoter) weight ratio was 7.6, and a second promoter/active ingredient weight ratio was 8.3 parts by weight.

A hydrogenation reaction for a catalyst activity test was carried out at a temperature of 230° C. The results thereof are shown in FIG. 1.

Example 2

1,500 mL of a solution including 262 g of sodium carbonate and 22.5 g of sodium sulfide as a precipitant was all injected within 1 hour by using a syringe pump, so that a second promoter/(active ingredient+first promoter+second promoter) weight ratio of a catalyst was 9.2. After completion of precipitation, a slurry had a pH of 7.8.

The other processes such as washing, filtering, and drying were the same as those in Example 1.

Based on the weight of the catalyst, an active ingredient content of a passivated catalyst was measured as 74.0 parts by weight, a weight of a second promoter was measured as 7.6 parts by weight, a weight of a first promoter was measured as 0.97 parts by weight, and an average size of nickel crystals was measured as 4.5 nm. A BET specific surface area was 250 $m^2/g$, a total pore volume was 0.32 $m^3/g$, and an average pore size was 5.6 nm. A nickel (Ni) reduction degree analyzed by $H_2$-TPR was 97%. The prepared second promoter/active ingredient weight ratio was 10.3 parts by weight.

A hydrogenation reaction for a catalyst activity test was carried out at a temperature of 230° C. The results thereof are shown in FIG. 1.

Example 3

1,500 mL of a solution including 262 g of sodium carbonate and 20.5 g of sodium sulfide as a precipitant was all injected within 1 hour by using a syringe pump, so that a second promoter/(active ingredient+first promoter+second promoter) weight ratio of a catalyst was 6.6. After completion of precipitation, a slurry had a pH of 7.5. The other processes such as washing, filtering, and drying were the same as those in Example 1.

Based on the weight of the catalyst, an active ingredient content of a passivated catalyst was measured as 74.4 parts by weight, a weight of a second promoter was measured as 5.3 parts by weight, a weight of a first promoter was measured as 0.95 parts by weight, and an average size of nickel crystals was measured as 4.9 nm. A BET specific surface area was 240 $m^2/g$, a total pore volume was 0.34 $m^3/g$, and an average pore size was 5.7 nm. A nickel (Ni) reduction degree analyzed by $H_2$-TPR was 96%.

In the prepared catalyst, the second promoter/(active ingredient+first promoter+second promoter) weight ratio was 7.1.

A hydrogenation reaction for a catalyst activity test was carried out at a temperature of 230° C. The results thereof are shown in FIG. 1.

Comparative Example 1

A typical hydrogenation catalyst known to those of ordinary skill in the art was prepared for a hydrogenation reaction. The hydrogenation catalyst was prepared in the same manner as in Example 1, and sodium sulfide was not used.

Based on the weight of the catalyst, an active ingredient content of a passivated catalyst was measured as 78.6 parts by weight, a weight of a second promoter was measured as 0.8 parts by weight, a weight of a first promoter was measured as 1.02 parts by weight, and an average size of nickel crystals was measured as 3.8 nm.

In the prepared catalyst, the second promoter/(active ingredient+first promoter+second promoter) weight ratio was 0.99 parts by weight, and the second promoter/active ingredient weight ratio was 1.02 parts by weight.

A BET specific surface area was 255 m$^2$/g, a total pore volume was 0.36 m$^3$/g, and an average pore size was 5.9 nm. A nickel (Ni) reduction degree analyzed by H$_2$-TPR was 85%.

A hydrogenation reaction for a catalyst activity test was carried out at a temperature of 230° C. The results thereof are shown in FIG. 1.

Table 1 below shows the components in the catalyst compositions of Examples 1 to 3 and Comparative Example 1.

TABLE 1

| Classification | Unit | Example 1 | Example 2 | Example 3 | Comparative Example 1 |
|---|---|---|---|---|---|
| Second promoter/ (active ingredient + first promoter + second promoter) | parts by weight | 7.6 | 9.2 | 6.5 | 0.99 |
| Second promoter/ Active ingredient | parts by weight | 8.3 | 10.3 | 7.1 | 1.02 |
| Ni crystallite size | nm | 4.4 | 4.5 | 4.9 | 3.8 |
| Active ingredient | parts by weight | 74.6 | 74.0 | 74.4 | 78.6 |
| First promoter | parts by weight | 0.95 | 0.97 | 0.95 | 1.02 |
| Second promoter | parts by weight | 6.2 | 7.6 | 5.3 | 0.8 |
| SiO$_2$ | parts by weight | 17.7 | 18.1 | 18.0 | 19.1 |
| BET specificSurface area | m$^2$/g | 250 | 250 | 240 | 255 |
| Total poreVolume | cm$^3$/g | 0.32 | 0.32 | 0.34 | 0.36 |
| Mean pore diameter | nm | 5.2 | 5.6 | 5.7 | 5.9 |
| Ni reduction degree | % | 95 | 97 | 96 | 85 |

Experimental Example 1 Catalyst Activity Test

A 300 ml autoclave including a hollow shaft stirrer and having a stirring speed of 1,600 rpm was used. 75 g of a solution, in which 30 wt % of a non-hydrogenated hydrocarbon resin was dissolved in Exxsol™ D40, was hydrogenated for 1 hour by adding a catalyst (Catal/DCPD resin) of 1-2% relative to the mass of the hydrocarbon resin at 230° C. and H$_2$ 90 bar. The color of the hydrocarbon resin solution after the hydrogenation was measured by ASTM D1209.

The color of the hydrocarbon resin (APHA value, standard representing the color of the solution) significantly proportional to the content of olefin in the hydrocarbon resin was 750 before hydrogenation, and the aromaticity was 18%.

The aromaticity was analyzed by 1H NMR.

TABLE 2

| Classification | Reaction temperature (° C.) | Catalyst (kg-cat/ kg-resin) | Aromatic/olefin hydrogenation ratio (%) | APHA value |
|---|---|---|---|---|
| Example 1 | 230 | 0.02 | 0.5 | 5 |
| Example 2 | 230 | 0.02 | 0.2 | 3 |
| Example 3 | 230 | 0.02 | 0.9 | 6 |
| Comparative Example 1 | 230 | 0.01 | 2.3 | 9 |

The results of the hydrogenation reaction under the conditions described in Table 2 in accordance with Experimental Example 1 are shown in Table 2.

According to the results of the hydrogenation reaction of Comparative Example 1, the aromatic/olefin hydrogenation ratio was high and the olefin selectivity was low. On the other hand, when Examples 1 to 3 were used, it was confirmed that the APHA values were similar to each other, but olefin was preferentially hydrogenated, and thus the aromaticity was selectively controllable. In addition, when the color of the hydrocarbon resin is 30 or less, the hydrocarbon resin becomes a water-white resin. At this time, the content of the remaining olefin (NMR % area) is less than 0.1%. Therefore, it is confirmed that Examples 1 to 3 can provide an excellent catalyst capable of providing a water-white hydrocarbon resin through a hydrogenation reaction.

While the present invention has been described by particular matters such as specific components and limited embodiments and drawings, this is provided only for helping the comprehensive understanding of the present invention. The present invention is not limited to the above-described embodiments, and it will be understood by those of ordinary skill in the art that various modifications and variations can be made thereto without departing from the scope of the present invention.

Therefore, it will be understood that the spirit of the present invention should not be limited to the above-described embodiments and the claims and all equivalent modifications fall within the scope of the present invention.

The invention claimed is:

1. A catalyst for a hydrogenation reaction, comprising: 0.5-3 parts by weight of at least one first promoter selected from copper and copper oxide, 3-15 parts by weight of at least one second promoter selected from sulfur and sulfur oxide, and 10-40 parts by weight of a silica carrier, based on 40-90 parts by weight of at least one active ingredient selected from nickel and nickel oxide.

2. The catalyst of claim 1, wherein the catalyst comprises the active ingredient, the first promoter, and the second promoter, and
the second promoter is included in an amount of 3-15 parts by weight based on 100 parts by weight of all of the active ingredient, the first promoter, and the second promoter.

3. The catalyst of claim 1, wherein the active ingredient is included in an amount of 50 parts by weight or more, the catalyst comprises the second promoter and the active ingredient, and the second promoter is included in an amount of 5-20 parts by weight based on 100 parts by weight of the active ingredient.

4. The catalyst of claim 1, wherein the active ingredient has a crystallite size of 3-8 nm.

5. The catalyst of claim 1, wherein the silica carrier is a porous carrier having a specific surface area of 200-400 $m^2/g$ and a pore size of 10-30 nm.

6. The catalyst of claim 1, wherein the hydrogenation reaction has higher selectivity to olefins relative to aromatics.

7. The catalyst of claim 1, wherein a reactant in the hydrogenation reaction is a hydrocarbon resin.

8. The catalyst of claim 7, wherein the hydrocarbon resin comprises at least one selected from a hydrocarbon resin including dicyclopentadiene (DCPD), a hydrocarbon resin including C 5 fraction, and a hydrocarbon resin including C 9 fraction.

9. The catalyst of claim 1, wherein the catalyst is in at least one form selected from a powder form, a particle form, and a granular form.

10. A method for preparing a catalyst for a hydrogenation reaction, the method comprising the steps of:
(a) preparing a first solution by dissolving 0.01-5 parts by weight of at least one promoter selected from copper and copper oxide and 10-40 parts by weight of a silica carrier in a solvent, based on 40-90 parts by weight of at least one active ingredient selected from nickel and nickel oxide;
(b) adding the first solution to a precipitation container and heating the first solution to a temperature of 60-100° C. while stirring;
(c) after the heating, preparing a second solution by adding a pH control agent and 3-15 parts by weight of at least one promoter selected from sulfur and sulfur oxide to a precipitation container, and adding the second solution dropwise to the first solution to prepare a precipitate;
(d) washing and filtering the precipitate and drying the precipitate to prepare a dried product; and
(e) reducing the dried product in a hydrogen atmosphere at a temperature of 200-500° C. to prepare a reduced product.

11. The method of claim 10, further comprising, after the step (e), passivating the catalyst.

12. The method of claim 11, wherein the passivating is performed with a nitrogen mixed gas including 0.1-20% oxygen.

13. The method of claim 11, wherein the passivating is performed by deposition in a solution including an organic solvent.

14. The method of claim 10, further comprising, after the step (d), calcining the prepared dried product in an air atmosphere of 200-500° C.

15. The method of claim 10, wherein the preparing of the precipitate in the step (c) is performed at pH 7-9.

16. A hydrogenation method for hydrogenating a hydrocarbon resin, comprising contacting a hydrocarbon resin with hydrogen in the presence of the catalyst prepared by the method of claim 10.

17. The hydrogenation method of claim 16, wherein the hydrocarbon resin comprises at least one selected from a hydrocarbon resin including dicyclopentadiene (DCPD), a hydrocarbon resin including C 5 fraction, and a hydrocarbon resin including C 9 fraction.

18. The hydrogenation method of claim 16, wherein the hydrocarbon resin has an aromatic/olefin hydrogenation ratio of 0.1-1.0 after a hydrogenation reaction.

19. The hydrogenation method of claim 16, wherein the hydrocarbon resin has an APHA value of 30 or less after the hydrogenation reaction.

* * * * *